United States Patent [19]

O'Neill

[11] Patent Number: 4,969,060
[45] Date of Patent: Nov. 6, 1990

[54] FLOPPY DISK WRITE PROTECTOR AND METHOD OF PROVIDING SAME

[76] Inventor: Richard J. O'Neill, 27 N. Grantham Rd., Dillsburg, Pa. 17019

[21] Appl. No.: 301,562

[22] Filed: Jan. 25, 1989

[51] Int. Cl.5 .............................................. G11B 23/03
[52] U.S. Cl. ...................................... 360/133; 360/60
[58] Field of Search ................................... 360/133, 60

[56] References Cited

U.S. PATENT DOCUMENTS 4,618,060 10/1986 Tarter ............................ 360/60 X
4,757,407 7/1988 Simokat ............................ 360/60
4,771,354 9/1988 Zschau ........................... 360/60 X
4,860,142 8/1989 DiGiesi .......................... 360/60 X Primary Examiner—A. J. Heinz

[57] ABSTRACT

A write protector (40) for floppy disks is applied to a disk envelope (10) and latched thereto via a slot (34) punched or formed in the envelope and movable to enable or disable writing upon the disk. A method for providing the disk envelope with the write protector is also taught.

9 Claims, 2 Drawing Sheets

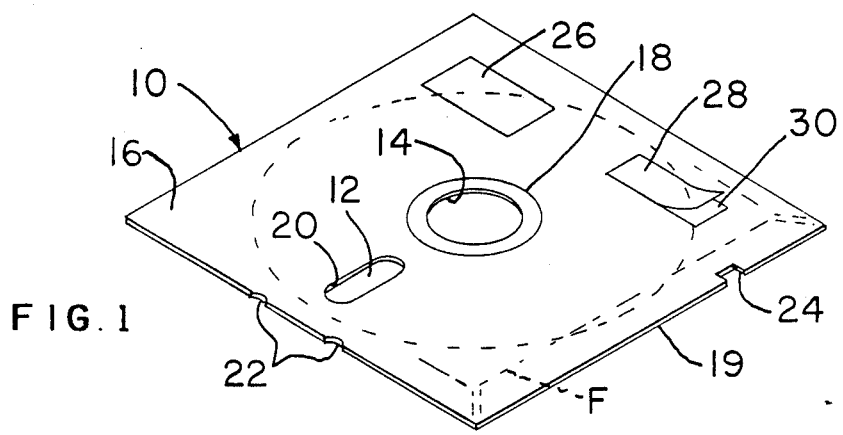
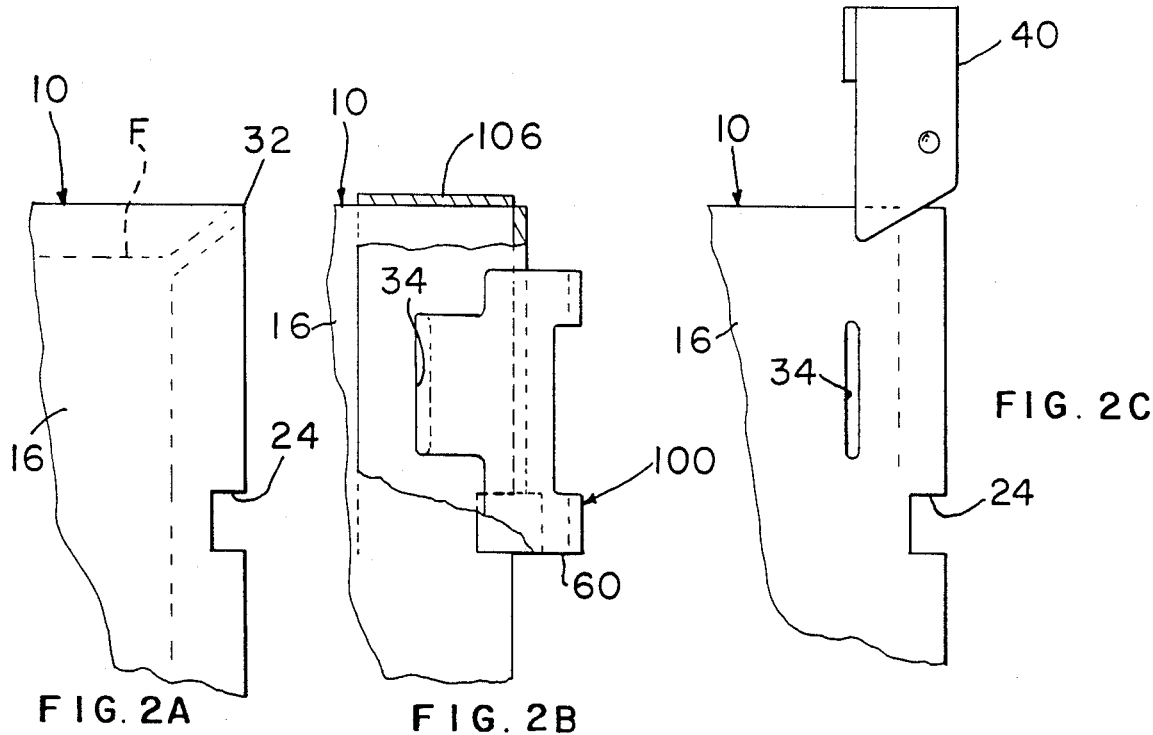
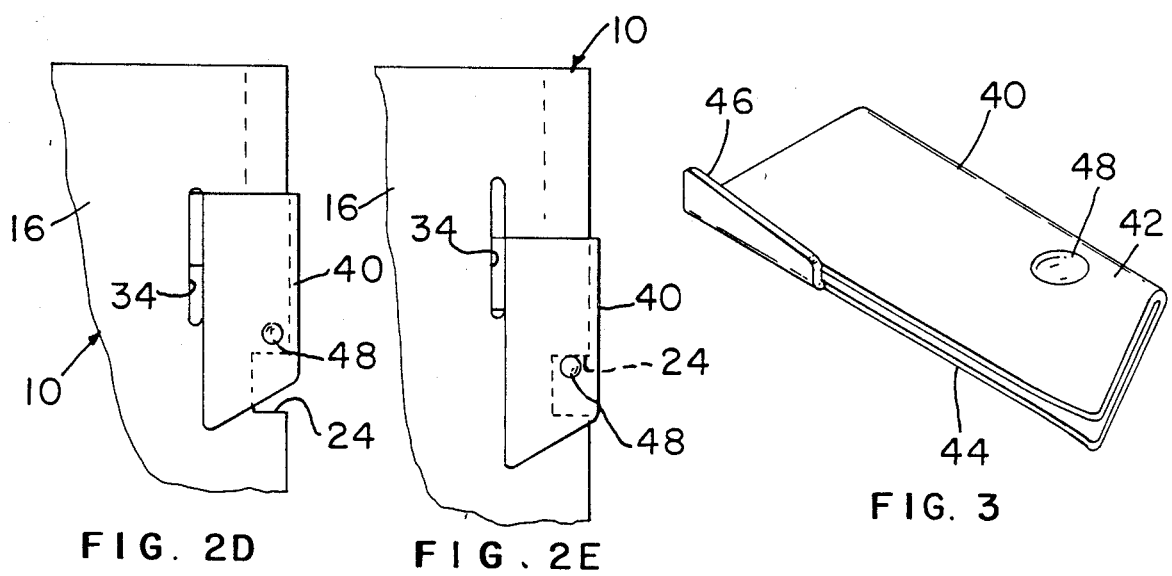

FLOPPY DISK WRITE PROTECTOR AND METHOD OF PROVIDING SAME

FIELD OF THE INVENTION

The present invention relates to a method, means and tool for promoting write protection for floppy disk memory devices and the like. The write protector is particularly adapted to installation and use with floppy disk constructions now widely utilized.

BACKGROUND OF THE INVENTION

U.S. Pat. No. 4,618,060 to Tarter granted Oct. 21, 1986 relates to a floppy disk casing or envelope with optional write protect capability and shows a variety of devices intended to cooperate with the envelope to be selectively displaced to permit or deny writing upon a disk. The Tarter devices slide within an edge of the disk envelope to cover or uncover a notch therein and thereby block or not block mechanical and/or optical sensing means which in turn disable or enable write head circuits, allowing the memory disk within such casing to be selectively written upon.

The approach in the Tarter patent distinguishes over other such write protect devices which are, in essence, "built in" to floppy disk packages, one such being shown in U.S. Pat. No. 4,549,240 to B. A. Hedges granted Oct. 22, 1985, and another being shown in U.S. Pat. No. 4,536,812 to K. Oishi et al. granted Aug. 20, 1985. A concept similar to that of the Tarter invention is shown in U.S. Pat. No. 4,521,820 to J. D. Fan issued June 4, 1985, which allows modification of a floppy disk package to provide write protection by selective movement of an element to cover the disk notch.

In both the Tarter and the Fan concepts, the write protect constructions rely for their utility upon the particular construction of the disk envelope; namely, that the outer edge of the envelope be so constructed as to provide a channel into which the write protectors thereof can be positioned for sliding movement within the disk package, between its outer covering walls.

A wide variety of floppy disk packages having envelopes of a wide variety of constructions have evolved and are now being utilized. Many of these do not include the constructional details of the earlier mentioned patents and therefore have no utility with respect thereto. These include many designs wherein there are no embossments or wells to establish defined channels within the disk envelope.

Accordingly, it is an object of the present invention to provide a method, tool and article of manufacture enabling write protection to be added to a wide range of floppy disk package envelope constructions wherein there is no particular channel defined by the edges thereof. It is a further object of the invention to provide a method, tool and article which can be applied to existing disk envelope designs after manufacture and by a disk user in a simple, inexpensive and reliable manner. It is yet a further object to provide a method and technique for modifying disk package envelopes by the simple expedient of punching a slot therein, which slot enables the addition of a write protector which is readily applied by user.

It is the final object of the invention to provide an improved method and article for providing write protection for floppy disks and the like not restricted by present disk manufacturing and constructional detail.

SUMMARY OF THE INVENTION

The foregoing objects of the present invention are achieved in the several embodiments illustrated by punching an elongated slot proximate to the standard "write" notch on a disk package envelope, typically located proximate to one edge thereof. This elongated slot allows the insertion of a clip, or cover, in sliding engagement with the exterior surfaces of the disk envelope and permanently latched thereto through engagement of portions thereof with the elongated slot and the edge of the envelope nearest thereto. The protector element can be hand-manipulated to either cover or uncover the write notch of the envelope and frictional detent means are provided to hold the protector in one position or the other as limited by engagement with the ends of the slot in the envelope.

The invention method embraces punching the elongated slot having desirable characteristics and applying the write protector element having characteristics cooperating with the slot to provide write protection. The invention contemplates a number of different preferred constructions for the write protector dependent upon the choice of materials utilized for such protector and the method of manufacture thereof.

In one embodiment, the write protector is formed of a single piece of metal, stamped and formed, and of material thin relative to the thickness of the disk package envelope, including a tab which is inserted within the elongated slot punched in the envelope. In a further embodiment, the write protector is made of a thin material which is folded around the envelope with a tab portion inserted through the elongated slot and a portion of the protector folded thereover with a portion of the tab inserted therethrough and bent down to lock the protector to the envelope.

A simple, one-piece tool is illustrated which allows a precise placement of the elongated slot in accordance with the invention method through surfaces therein adapted to engage exterior surfaces, including the write notch of the envelope to properly position the elongated slot necessary for functioning of the invention. The edge surfaces of the slot and the exterior edge surfaces of the disk envelope provide alignment and guidance, eliminating the need for entering interiorly of the envelope and thus reliance upon interior channels, embossments, adhesive areas and the like.

BRIEF DESCRIPTION OF THE DRAWINGS

The foregoing invention as described should be taken in conjunction with the following drawings illustrating preferred embodiments.

FIG. 1 is a perspective of a prior art floppy disk of typical construction.

FIGS. 2A-2E are plan views of a corner of a floppy disk package of standardized construction modified in accordance with the invention and having the invention article in one embodiment applied thereto in a position uncovering a write notch and covering such notch.

FIG. 3 is a perspective showing the write protector of the invention in one embodiment.

DETAILED DESCRIPTION OF THE INVENTION

Figure 4:
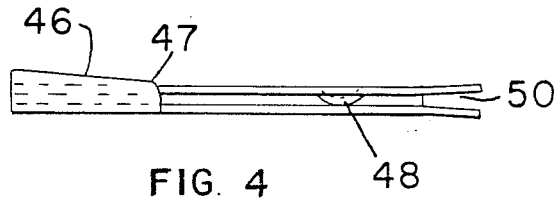
FIG. 4 is a side, elevational view of the write protector shown in FIG. 3.

In FIG. 1, a disk package envelope containing a floppy disk which is typical of constructions in wide use today in both the 5¼" and 8" sizes is revealed. The disk package 10 is shown to contain a thin magnetic element, the floppy disk 12, the outline of which can be shown in phantom to be circular to include a central spindle which facilitates drive of the disk in rotation for writing and reading functions. Package 10 may be seen to include an outer casing or envelope 16 having a central aperture 18 larger than the disk spindle 14. The envelope 16 further includes on both sides thereof an elongate aperture 20 which facilitates reading and writing upon disk 12. In the bottom or lower edge surface of the envelope 16 are indentations shown as 22 which are punched out of the edge and operate as orientation surfaces, allowing orientation of the disk packages when stacked. Also shown in FIG. 1 in the right handed outside edge 19 of the envelope 16 is a notch 24 which serves as a means to allow or deny writing upon disk 12.

In a typical construction for a 5¼" outside edge dimension for a disk package envelope, the upper edge of notch 24 is positioned roughly 1.20 inches from the corner shown as 32 in FIGS. 1-2E. The notch 24 is typically 0.250 inches in length by 0.150 inches in depth or width. Envelopes such as 16 are typically 0.050 inches in thickness, including the three layers material. The three layers are the top layer shown in FIG. 1, a bottom layer similar thereto, and a folded edge shown as F and in phantom on the right handed side of the disk package.

Also shown in FIG. 1 is a label 26 which is utilized to identify the disk and commonly a piece of adhesive tape 28 having the left-end portion thereof stuck to the material 16 and the right-end portion thereof stuck to a paper insert shown as 30 to allow such tape to be readily removed. The purpose of such tape is to be applied to cover over the notch 24, the tape being folded therearound and over the notch. The presence of the tape 28 blocks the notch from either optical signals or mechanical feelers which in turn control the mechanism and/or read/write head employed with respect to the disk. The absence of tape 28 allows such signals or mechanisms to enable writing upon the disk.

The write protect features provided by prior art devices and by the invention prevent valuable programs and information stored on a disk from being inadvertently written over and thereby erased and lost to the disk user. With respect to many applications, the need to protect against inadvertent writing and then later to allow specific write instructions, or the addition of data, is frequent and continuous, requiring the application and then later removal of the tape, which not only wears out, but becomes difficult to use and occasionally may come loose to jam the disk package within the machine or preclude its proper insertion therein. The previous prior art patents cited above are intended to eliminate use of tape for the foregoing reasons.

Figure 7:
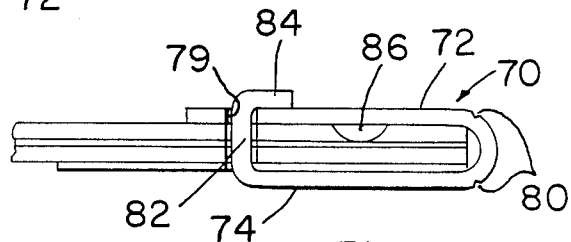
FIG. 7 is a cross-sectional view through lines 7—7 of the embodiment shown in FIG. 6.

Referring now to FIG. 2A, the upper right-hand corner of a typical disk package envelope is shown, including the folds shown as F which bind the top and bottom layers of the disk package together. FIG. 7 reveals, in cross-section, the typical lamination of the folds to the lower layer of the envelope. The fold may be bonded by adhesive suitable to the constituents of the envelope material, typically plastic, paper, or impregnated paper.

FIG. 2B shows the envelope corner of FIG. 2A in the process of having an elongated slot 34 punched therein by a tool and in a method to be described in detail hereinafter, which operates both as a punch and a jig fixture. The tool is shown as 60 in FIG. 2B positioned on the envelope corner proximate notch 24. FIG. 2C shows the envelope corner following the punching of the elongated slot 34 which is made to extend fully through the three layers of package material. Also shown in FIG. 2C is the first embodiment of the invention, a write protector 40 in the process of being slid onto the package envelope from the corner 32 along the axis indicated in FIG. 2C. Details to be hereinafter described facilitate this insertion. FIG. 2D shows the write protector 40 of the invention first embodiment in position, latched to the envelope by virtue of portions thereof extended through the elongated slot 34. FIG. 2E shows the protector 40 displaced to provide write protection by covering over slot 24. The invention method and article thus contemplate punching an elongated slot fully through the envelope of a floppy disk package with the addition of a write protector fitted over the outside of the envelope and caused to engage cooperatively the elongated slot punched therein. The write protector is then manipulated from an upward, or uncovered, position as shown in FIG. 2D to a downward, or notch covered, position as shown in FIG. 2E.

With respect to the first embodiment shown in the preceding figures, FIG. 3 shows 40 in more detail. It may be seen from FIG. 3 that the write protector 40 includes an upper, flat, and planar material portion 42 and a similar lower portion 44, including an upstanding tab 46 which is orthogonally disposed with respect to the planes of 42 and 44. Included in the upper surface portion 42 is an indentation, a rounded dimple 48 stamped and formed into the material in the case of a use of metal material for the protector 40. This indentation could be thermo-formed in the event the material of 40 is a plastic material which is also contemplated.

Figure 5:
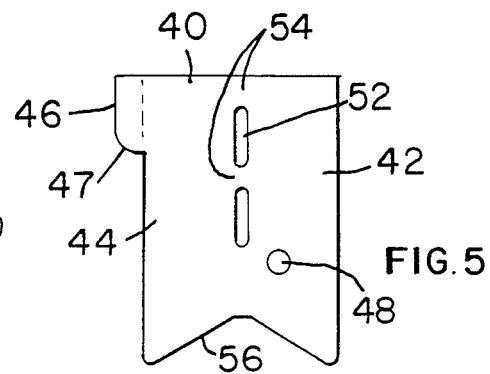
FIG. 5 is a plan view of the write protector shown in FIGS. 3 and 4 in blank prior to forming into its final configuration.

FIG. 4 shows a side of an elevational view of the write protector 40. There, the upstanding tab may, in this embodiment, be seen to have a sloped, or rounded, leading surface 47 which facilitates insertion of the protector over the edge of the disk envelope along the axis indicated in FIG. 2C to the position indicated in FIG. 2D. Further shown in FIG. 4, is the feature provided by the indentation or dimple 48 which holds the top and bottom portions 42 and 44 slightly open as at 50. This opening facilitates insertion of the protector over the edge of the disk envelope. The dimple 48 operates to provide a controlled, frictional engagement of the protector 40 with the envelope and in the covered position drops into the notch to provide a tactile indication of being properly seated, a detent action. FIG. 5 shows the protector 40 in blank, as it would be initially formed from flat metal or plastic stock. As can be discerned, protector 40 includes additionally elongated slots 52 which define hinge portions 54 interconnecting the top 42 and bottom 44 planar portions of the protector. The length of the slots 52 can be altered to control the spring characteristics of the protector, depending upon the thickness of the material used, metal or plastic. In FIG. 5, the leading edge of the protector 40 is shown to be tapered as at 56. This feature permits a reduced insertion force as the protector is slid onto the package in the manner shown in FIG. 2C and makes certain that the protector is well onto the envelope before significant frictional forces become involved. This is because initially only a point contact is made between the protector 40 and the envelope package. The spacing between the upper portion 42 and the lower portion 44 created by the dimple 48 and the tapering as at 56 also precludes stubbing, or snagging, of the leading end surfaces of 40 on the transverse edges of notch 24, which could result in damage to the notch edges and eventually, damage to the package envelope. Note that the leading edge of the tape does not enter notch 24 but rides upon the exterior of envelope 16 at all times.

It is contemplated that the protector 40 may be fabricated from sheet material such as a non-magnetic stainless steel suitably stamped and formed from the blank configuration shown in FIG. 5 to the folded configuration shown in FIGS. 3 and 4. Material on the order of between 0.003 and 0.007 inches in thickness for a metallic version would be suitable. Alternatively, if a softer material, such as aluminum, is utilized, the material may be on the order of 0.005 to 0.010 inches in thickness. In the event that plastic material is employed for the protector, thicknesses of on the order of 0.007 to 0.010 inches are recommended, for such materials as polyester, as for example, mylar, or a variety of other plastic materials which are stiff and can be readily formed through processes such thermoforming into the necessary configurations.

With respect to the invention concept, it is important that the elongated slot 34 be sufficiently long so as to allow a displacement of protector 40 to a position adequately uncovering the notch 24 as is shown in FIG. 2D to the position adequately covering notch 24 as shown in FIG. 2E. It is to be understood that such displacement need only be sufficient to block or unblock either an optical signal or a mechanical member from entering portions of the notch region to thus provide a control over the write function. It is important that the right-handed edge of elongated slot 34 be positioned precisely relative to edge 19 so as to support the protector against transverse movements. The protector 40 is thus aligned for movement along the axis indicated in FIGS. 2C-2E, which is parallel to the package envelope edge 19. The slot 34 is also oriented parallel to such edge and is of a length to permit movement of the protector to cover notch 24, or at least a sufficient portion thereof, to block the optical and/or mechanical means employed to control write functions. Protector 40 operates by virtue of the engagement of the bite portion of the protector as defined by the top and bottom portions 42 and 44 through the strap portions 54, as shown in FIG. 5, in conjunction with the tab 46 and its engagement with the elongated slot 34. In practice, the slot 34 should be narrow relative to the thickness of the material of the protector 40 when taken in consideration to the practical aspects of punch width and the ability to punch a clean slot through the envelope 16. A punch on the order of 0.015 to 0.030 inches in width would be adequate for the aforementioned thicknesses of material for the protector 40. The slot 34 could be made to have a length on the order of 0.500 to 0.600 inches for use with a write protect notch having a length on the order of 0.250 inches.

Figure 6:
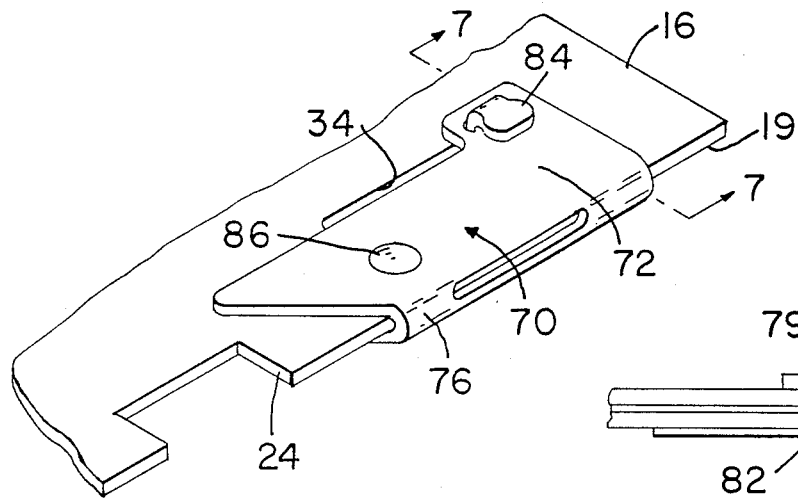
FIG. 6 is a perspective showing the corner of a disk envelope having the invention protector in a second embodiment applied thereto.
Figure 8:
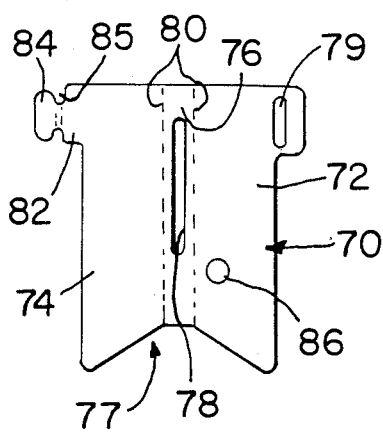
FIG. 8 is a plan view of the blank of the embodiment shown in FIGS. 6 and 7 prior to being formed over in the manner shown in such figures.

Referring now to FIGS. 6-8, an alternative embodiment of the protector of the invention is shown as protector 70. FIG. 6 shows the protector 70 mounted for use on the right-hand corner of an envelope 16 having a notch 24 and the slot 34 as previously described. The protector 70 may be seen in FIGS. 6-8 to include a top flat, planar portion 72, a bottom flat, planar portion 74, the two portions joined by strap portion 76 apertured as at 78. Portions 72 and 74 are tapered as at 77 to reduce frictional loading upon insertion. Portions 72 and 74 are relieved as at 80 to define a hinge for 70 which positions the portions 72 and 74 properly for fitting tightly over the outside surface of the envelope 16 in the manner shown particularly in FIG. 7. Portion 72 includes a slot shown as 79 in FIG. 8. Portion 74 includes a tab portion 82 including a projection 84 adapted to fit through the slot 79 and be folded over in the manner shown in FIG. 7 to latch the protector against accidental displacement with respect to the envelope 16. There is included an embossment, or reduced section, shown as 85 between tab portion 82 and projection 84. Also included, in the portion 72 is a dimple 86 designed to provide a frictional and detent engagement between protector 70 and envelope 16 and further preclude stubbing of the leading edges of the protector against the edges of the notch 24. Note that the leading edges of protector 70 do not enter notch 24 but ride upon the portion 72 and 74.

With respect to the embodiment, protector 70, the material employed may be softer than the earlier disclosed embodiment, the latching mechanism operating to hold the protector closed and locked to the envelope. In the event that the embodiment 70 is formed of a sheet plastic material such as mylar, it is preferably stamped and then thermoformed into a semi-closed position. This position would be similar to that shown in FIG. 7, but without the tab 82 and the projecting portion 84 inserted through the envelope and through slot 78. In use, the envelope 16, having had the slot 34 punched therein or formed therein would be held with the projecting portion 84 inserted through the slot 34 followed by the insertion of the tab portion 82 with the top portion 72 folded around and the projecting portion 84 then manipulated through slot 79 to assume the position shown in FIGS. 6 and 7, the extended portion 84 residing as thermoformed in a flat condition overlying portion 72.

Figure 9:
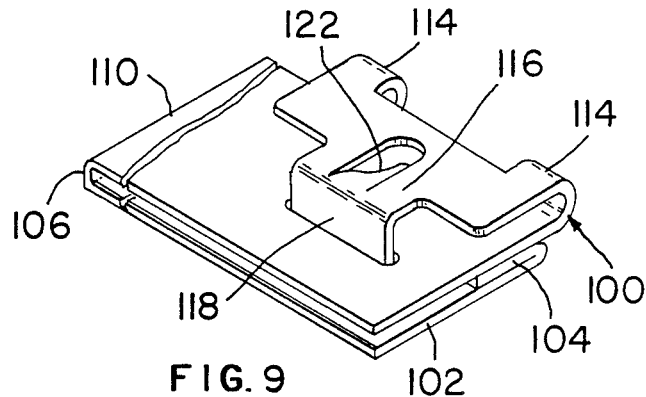
FIG. 9 is a perspective of a tool utilized to punch an elongated slot in a disk envelope.
Figure 10:
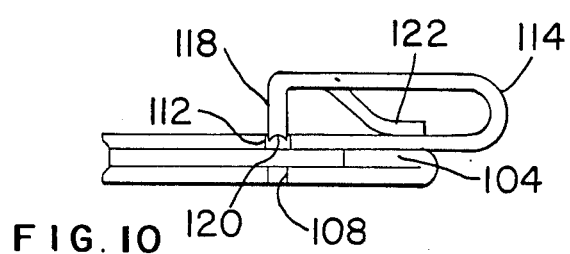
FIG. 10 is an elevational view of the tool of FIG. 9 showing in part sectional details of the punch portion thereof.

Referring now to FIGS. 9 and 10, an illustrative embodiment of a tool 100 is shown which may be employed to punch slots 34 in the envelope 16. The tool 100 may be seen to include a lower portion 102 which is flat and of a dimension to allow the tool to be used as a jig with respect to positioning of a punch contained on the tool for proper positioning of the slot 34 relative to notch 24 and the corner 32 of the envelope as shown in FIGS. 2A and 2B. At one end of the lower planar portion 102 is a turned-back ear 104 which has a dimension to fit within the notch 24 of the envelope and the tool 100 has a turned-up wall shown as 106 in FIG. 9 and in FIG. 2B which positions the tool in conjunction with 104 properly upon envelope 16. As shown in FIG. 10, the lower portion 102 includes an aperture, or slot, 108 which serves as a die to receive material of the envelope punched out upon operation of the tool. An upper portion, which is flat and planar, shown as 110, is made to overlie portion 102 and be spaced therefrom a distance slightly larger than a typical envelope to allow insertion of the envelope therewithin. The upper portion 110 includes a slot shown as 112 allowing entry of the tool punch intended to align and guide such tool punch during operation. Extended from portion 110 is a U-shaped hinge portion shown as 114, one at each end of the structure of the tool. A projecting portion 116 is extended from the hinge portions 114 to turn vertically as at 118 and made it to carry at the end thereof, a punch 120 fitted within the slot 112. Further provided struck from the body of 116 is a spring shown as 122 positioned to bias 116 upwardly and hold the end of 120 clear for insertion of an envelope between 102 and 110. In use, an envelope would be inserted within the tool 100 properly seated and aligned by the interior surfaces of bite 106 and the projection 104 with a tool then closed by the arm 116 being driven downwardly to cause the punch 120 to cut through the envelope material and just enter the upper portion of die 108 pushing the cut material of the envelope down through the die.

In manufacture, the tool 100 may be stamped and formed of a suitable steel with the punch suitably formed and preferably hollow ground by forming of the remaining geometry of the tool and suitable heat treatment to provide suitable spring characteristics, durability, and life to the tool.

The tool 100 may be suitably used with simple pliers, a small hammer, or other means of providing an adequate load to effect the punching action.

While the invention thus far described and disclosed has emphasized a use with existing floppy disk package envelopes wherein appropriate slots are punched therefrom, it is fully contemplated that the benefits of the invention in certain of its aspects can be employed with envelopes having preformed, elongated slots effected prior to the initial sale and/or conveyance to an end-user of the floppy disk.

In certain applications having tight dimensional parameters regarding the width of an envelope, a portion of the envelope along the edge carrying the notch may be removed to accommodate for the thickness of the protector so that the protector does not extend beyond the outside plan form of the envelope, though generally such is not necessary.

Having now described the invention in terms intended to enable a preferred practice thereof, I claim:

1. A method of providing write protection for floppy disk memory devices and the like of a type having an outer, flat, thin envelope, including a notch of a given length on one edge thereof which, when covered, cooperates with a disk reader mechanism to preclude writing upon said disk and when uncovered, permits writing upon said disk the said method comprising:
   a. providing a punch adapted to punch through the said envelope and define a slot of a length substantially greater than the length of said notch,
   b. positioning said punch well inboard relative to said one edge and said notch to precisely locate said punch,
   c. punching a slot with the said length thereof oriented parallel to the said one edge,
   d. inserting a write protector onto said envelope including a tab portion of a length substantially less than said slot length and extended through said slot with further portions adapted to cover at least a portion of said notch sufficient to block the writing function thereupon upon displacement of said protector and sliding engagement over the outside of said envelope, and
   e. causing said protector to be latched to said envelope against accidental displacement therefrom.

2. The method of claim 1 wherein the said step of punching a slot includes punching a slot at least twice as long as the length of said notch in said envelope.

3. An article of manufacture for providing write protection for a floppy disk or the like, comprising:
   (a) an envelope surrounding the said disk;
   (b) a notch contained in said envelope along an edge thereof;
   (c) said envelope further having an elongate narrow slot proximate the said notch and parallel to the said edge;
   (d) a write protector having planar cover portions and a tab portion extending through said slot and movable along said slot, said tab portion limiting movement of said protector between a first position uncovering said notch and a second position covering said notch via said cover portions extending over the exterior of a portion of said envelope;
   (e) said protector further including means to engage said edge of said envelope to guide the said protector along said envelope in cooperation with said tab portion extended through said slot along an axis generally parallel to said edge.

4. The article of claim 3 wherein the said planar portions include edges which ride on the surfaces of said envelope as said protector is positioned to preclude interference with the edges of said notch.

5. The article of claim 3 wherein the said protector is formed of a material which is thin relative to the thickness of said envelope and includes a projection adapted to engage the surface of said envelope to provide a specific frictional and detenting engagement therewith to hold said protector in a given position on said envelope.

6. The article of claim 3 wherein the said tab portion includes latch means adapted to latch said protector to said envelope.

7. The article of claim 3 wherein the said protector is comprised of a U-shaped metal clip of a material having a thickness substantially less than the thickness of said envelope.

8. The article of claim 3 wherein the said protector is comprised of a sheet material folded over to provide the covering portions of said protector.

9. The article of claim 8 wherein the said protector is comprised of thin plastic sheet material.

* * * * *